United States Patent
Hannemann et al.

(10) Patent No.: US 6,341,486 B2
(45) Date of Patent: Jan. 29, 2002

(54) GAS AND STEAM TURBINE PLANT

(75) Inventors: Frank Hannemann, Spardorf; Ulrich Schiffers, Eckental, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/761,243

(22) Filed: Jan. 17, 2001

Related U.S. Application Data

(63) Continuation of application No. PCT/DE99/02106, filed on Jul. 8, 1999.

(30) Foreign Application Priority Data

Jul. 17, 1998 (DE) .......................................... 198 32 293

(51) Int. Cl.⁷ .............................................. F02B 43/00
(52) U.S. Cl. ...................... 60/39.12; 60/39.12; 60/734; 60/39.182
(58) Field of Search ................................ 60/734, 39.12, 60/39.182, 736

(56) References Cited

U.S. PATENT DOCUMENTS

| | | | |
|---|---|---|---|
| 4,697,413 A | * 10/1987 | Pohl ........................... | 60/39.02 |
| 5,319,924 A | 6/1994 | Wallace et al. | |
| 5,912,198 A | * 6/1999 | Feitelberg ................... | 60/39.02 |

FOREIGN PATENT DOCUMENTS

| | | |
|---|---|---|
| DE | 33 31 152 A1 | 3/1985 |
| DE | 38 17 690 A1 | 12/1989 |
| DE | 41 07 109 C1 | 10/1992 |
| EP | 0 413 199 A1 | 2/1991 |
| GB | 2 234 984 A | 2/1991 |

OTHER PUBLICATIONS

Japanese Patent Abstract No. 3–210028 (Funayama), dated Sep. 13,1991.

"Effiziente und umweltfreundliche Stromerzeugung im GUD–Kraftwerk mit integrierter Vergasung" (Haupt), dated Feb. 1996.

"Thermodynamische Analyse von Kombi–Prozessen mit integrierter Kohlevergasung und $CO_2$–Rückhaltung" (Pruschek et al.), dated Jul. 1993.

* cited by examiner

Primary Examiner—Charles G. Freay
Assistant Examiner—Ehud Gartenberg
(74) Attorney, Agent, or Firm—Herbert L. Lerner; Laurence A. Greenberg; Werner H. Stemer

(57) ABSTRACT

In a gas and steam turbine plant with a waste-heat steam generator, a fuel gasification device is located upstream of the combustion chamber of the gas turbine via a fuel line. The after-heat steam generator is located downstream of the gas turbine on the flue-gas side and the heating surfaces of which are connected into the water/steam circuit of the steam turbine for the integrated gasification of a fossil fuel. For especially high plant efficiency, a heat exchanger is connected on the primary side into the fuel line between the gasification device and a saturator. In addition to a mixing device for admixing nitrogen, the heat exchanger likewise is connected on the secondary side into the fuel line between the saturator and the combustion chamber.

4 Claims, 2 Drawing Sheets

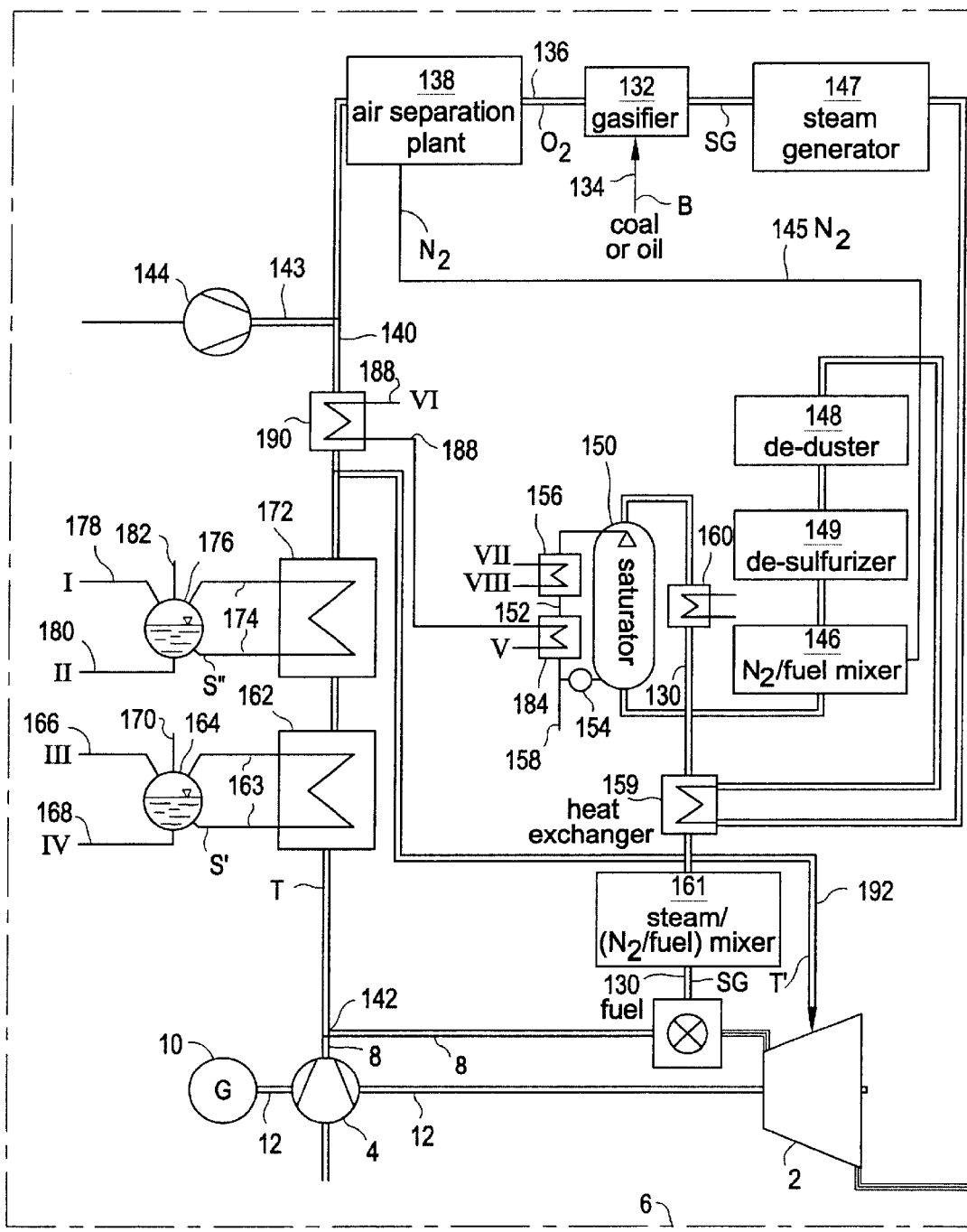

GAS AND STEAM TURBINE PLANT

CROSS-REFERENCE TO RELATED APPLICATION

This application is a continuation of copending International Application No. PCT/DE99/02106, filed Jul. 8, 1999, which designated the United States.

BACKGROUND OF THE INVENTION

Field of the Invention

The invention relates to a gas and steam turbine plant with a heat recovery steam generator which is located downstream of a gas turbine on the flue-gas side and the heating surfaces of which are connected into the water/steam circuit of a steam turbine, and with a fuel gasification device located upstream of the combustion chamber of the gas turbine via a fuel line.

A gas and steam turbine plant with integrated gasification of fossil fuel conventionally includes a fuel gasification device. The gasification device is connected on the outlet side to the combustion chamber of the gas turbine via a number of components provided for gas purification. The gas turbine heat recovery steam generator, the heating surfaces of which are connected into the water/steam circuit of the steam turbine. A plant of this type is known, for example, from UK Patent Application GB-A 2 234 984.

Furthermore, German Published, Non-Prosecuted Patent Application DE 33 31 152 A1 discloses a method for operating a gas turbine plant combined with a fuel gasification plant. In this case, nitrogen can be supplied to the fuel gas directly upstream of the combustion chamber.

In this plant, a saturator is connected into the fuel line between the gasification device and the combustion chamber of the gas turbine. In the saturator, the gasified fuel is laden with steam. Such a plant reduces pollutant emission during the combustion of the gasified fossil fuel. For this purpose, the gasified fuel flows through the saturator, countercurrent to a water stream. The water stream is carried in a water circuit designated as a saturator circuit. For especially high efficiency, heat can be fed from the water/steam circuit into the saturator circuit.

By coming into contact with the heated water stream in the saturator, which is carried in the saturator circuit, the gasified fuel is saturated with steam and to a limited extent undergoes heating. In this case, for thermal and also operational reasons, further heating of the fuel may be necessary before the fuel is supplied into the combustion chamber of the gas turbine.

SUMMARY OF THE INVENTION

It is accordingly an object of the invention to provide a gas and steam turbine plant that overcomes the hereinaforementioned disadvantages of the heretofore-known devices of this general type and that has especially high plant efficiency.

With the foregoing and other objects in view, there is provided, in accordance with the invention, a gas and steam turbine plant. The gas and steam turbine plant includes a gas turbine, a steam turbine, a heat recovery steam generator, a heat exchanger, and a mixing device. The gas turbine has a flue-gas side and a combustion chamber. The steam turbine has a water/steam circuit. The heat recovery steam generator is located downstream of said gas turbine on said flue-gas side. The heat recovery generator has heating surfaces connected into the water/steam circuit of said steam turbine. The heat recovery steam generator has a fuel gasification device located upstream of the combustion chamber of the gas turbine on a fuel line. The heat exchanger has a primary side and a secondary side connected on the primary side into the fuel line between the gasification device and a saturator. The heat exchanger connects on the secondary side into the fuel line between the saturator and the combustion chamber. The mixing device admixes nitrogen in the fuel line between the heat exchanger and the saturator.

In accordance with another feature of the invention, the gas and steam turbine plant includes a crude-gas heat recovery steam generator upstream of the saturator. The crude-gas heat recovery steam generator precedes the heat exchanger in the fuel line.

In accordance with another feature of the invention, the gas and steam turbine plant includes a further heat exchanger. The further heat exchanger has a primary side and a secondary side. The secondary side of the further heat exchanger connects into the fuel line between the saturator and the combustion chamber.

In accordance with another feature of the invention, the further heat exchanger is heated by feedwater.

In accordance with this object, a heat exchanger is connected on the primary side into the fuel line between the gasification device and the saturator, in addition to a mixing device for admixing nitrogen, and is likewise connected on the secondary side into the fuel line between the saturator and the combustion chamber.

In a plant of this type, the admixing of nitrogen to the gasified fossil fuel, also designated as synthesis gas, is intended for maintaining particularly low $NO_x$ limit values in the combustion of the synthesis gas. The mixing device provided for admixing the nitrogen is connected into the fuel line upstream of the saturator on the fuel side. The heat exchanger is, in this case, connected into the fuel line upstream of the mixer and saturator on the primary side and downstream of the saturator on the secondary side. The heat exchanger thus transmits heat from the synthesis gas, also designated as crude gas, flowing into the saturator into the synthesis gas, also designated as mixed gas, flowing out of the saturator. The heat exchanger (also designated as a crude-gas/mixed-gas heat exchanger) thus gives rise to an at least partial heat-side bypass of the saturator. Thereby, the thermodynamic losses of the overall process are kept particularly low due to the heating of the synthesis gas by the crude gas. The fuel-side arrangement of the mixing device upstream of the saturator at the same time ensures that the crude-gas/mixed-gas heat exchanger transmits the heat from the crude gas to a particularly large mass stream. Thus, by virtue of an arrangement of this type, a particularly favorable heat exchange can be achieved, since, under the boundary condition of a constant final temperature, a comparatively large quantity of heat can be transmitted to the mixed gas flowing out of the saturator.

For especially high plant efficiency, in an advantageous development, the crude-gas/mixed-gas heat exchanger is preceded in the fuel line by a crude-gas heat recovery steam generator upstream of the saturator. The crude-gas heat recovery steam generator precools the synthesis gas or crude gas generated in the gasification device. This precooling is beneficial for material reasons. At the same time, the heat extracted from the crude gas can be utilized in an especially beneficial way for steam generation. In steam generation, in a plant designed for the gasification of coal as fossil fuel, a so-called gas quench may be provided, in which so-called quench gas, branched off from the fuel line at a point between the crude-gas/mixed-gas heat exchanger and the saturator, is supplied to the synthesis gas before the latter enters the crude-gas heat recovery steam generator. In an arrangement of this type, the crude-gas mass flow is approximately comparable to the mixed-gas mass flow, so that the mixed gas can be preheated by heat exchange with the crude gas to temperatures of well above three degrees Celsius (>300° C.) under customary operation conditions.

Expediently, a further heat exchanger is connected on the secondary side into the fuel line between the saturator and the combustion chamber. The further heat exchanger can be heated, for example, with a medium-pressure feedwater. In this arrangement, even in the case of only limited cooling of the crude gas, for example because of boundary conditions set by a crude-gas dedusting device, reliable preheating of the mixed gas, along with especially high plant efficiency, is ensured. A concept of this type for mixed-gas preheating is also particularly suitable for a plant that is designed for the gasification of coal as fossil fuel and in which gas quench is not provided or for a plant designed for the gasification of oil as fossil fuel. Particularly in the case of a plant designed for the gasification of coal and without gas quench, the crude-gas mass flow is usually approximately half the mixed-gas mass flow. This limits the mixed-gas preheating by the crude-gas/mixed-gas heat exchanger to a temperature range of about 200° C. to 230° C. Therefore, in a plant of this type, additional mixed-gas preheating via a further heat exchanger is especially beneficial. The further heat exchanger can be heated with high-pressure feedwater.

Advantages of the invention include, that the crude-gas/mixed-gas heat exchanger, provided in addition to the mixing device connected into the fuel line upstream of the saturator, allows the heat exchanger to have an especially favorable transmission of heat from the crude gas flowing into the saturator to the mixed gas flowing out of the saturator, by bypassing the saturator. Therefore, thermodynamically unfavorable cooling and reheating of the synthesis gas are necessary only to a limited extent, so that the efficiency of the gas and steam turbine plant is especially high.

Other features that are considered as characteristic for the invention are set forth in the appended claims.

Although the invention is illustrated and described herein as embodied in a gas and steam turbine plant, the invention is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1A is a schematic and block diagram of a gas turbine plant portion of a gas and steam turbine plant.

DESCRIPTION OF THE PREFERRED EMBODIMENTS

Figure 1B:
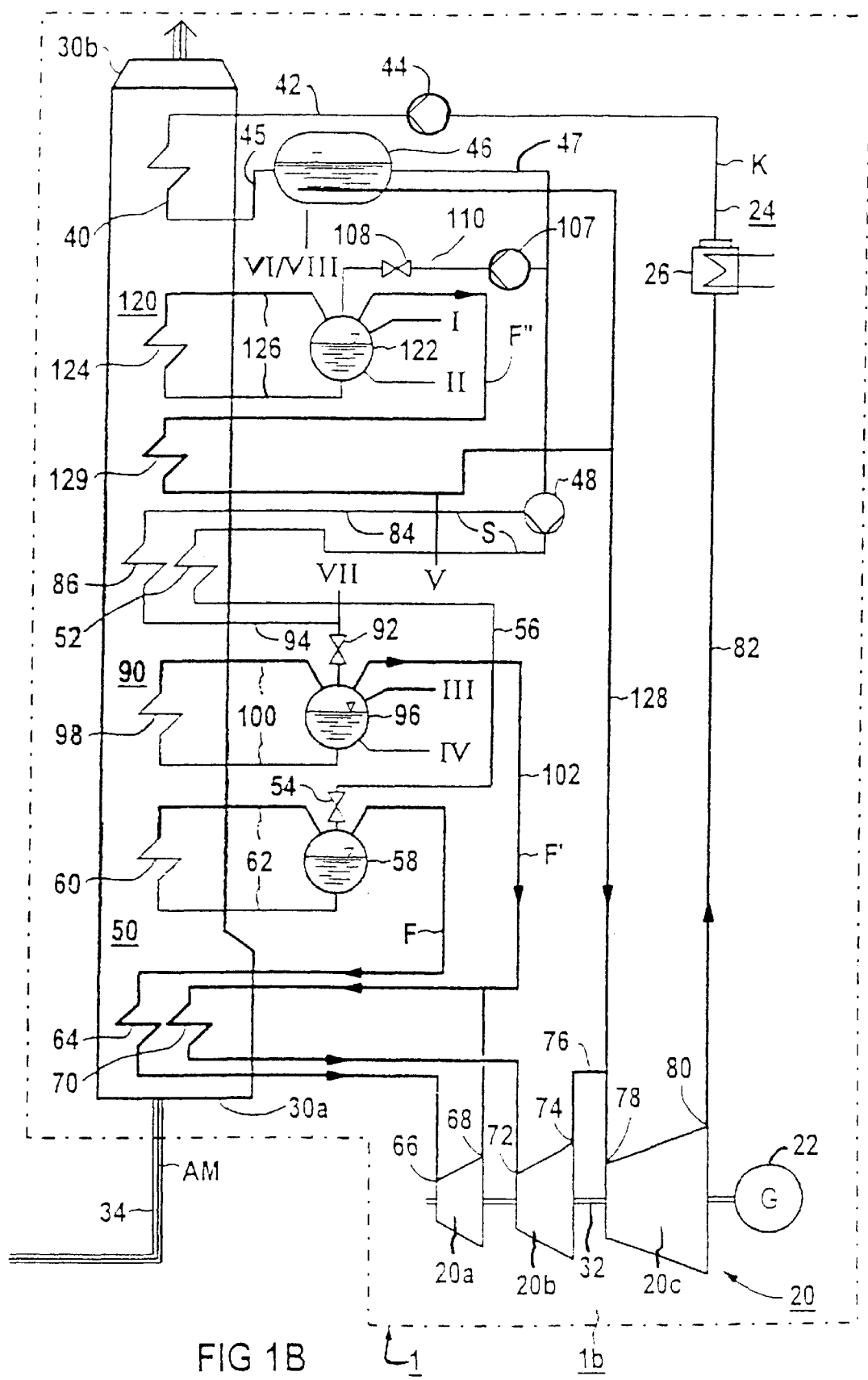
FIG. 1B is a schematic diagram of a steam turbine plant portion of the gas and steam turbine plant.

In all the figures of the drawing, sub-features and integral parts that correspond to one another bear the same reference symbol in each case.

Referring now in detail to the single figure of the drawings, there is seen a gas and steam turbine plant 1 that includes a gas turbine plant 1a and a steam turbine plant 1b. The gas turbine plant 1a includes a gas turbine 2 with a coupled air compressor 4 and a combustion chamber 6 that is located upstream of the gas turbine 2 and that is connected to a compressed-air line 8 of the compressor 4. The gas turbine 2 and the air compressor 4 and also a generator 10 are seated on a common shaft 12.

The steam turbine plant 1b includes a steam turbine 20 with a coupled generator 22 and, in a water/steam circuit 24, a condenser 26 located downstream of the steam turbine 20 and also a heat recovery steam generator 30. The steam turbine 20 has a first pressure stage or high-pressure part 20a, of a second pressure stage or medium-pressure part 20b and of a third pressure stage or low-pressure part 20c, which drive the generator 22 via a common shaft 32.

In order to supply working medium AM or flue gas, expanded in the gas turbine 2, into the heat recovery steam generator 30, an exhaust-gas line 34 is connected to an inlet 30a of the heat recovery steam generator 30. The expanded working medium AM from the gas turbine 2 leaves the heat recovery steam generator 30 via its outlet 30b in the direction of a chimney which is not illustrated in any more detail.

The heat recovery steam generator 30 comprises a condensate preheater 40 that can be fed on the inlet side with condensate K from the condenser 26 via a condensate line 42, into which a condensate pump unit 44 is connected. The condensate preheater 40 is connected on the outlet side to a feedwater tank 46 via a line 45. Moreover, in order to bypass the condensate preheater 40, as required, the condensate line 42 can be connected directly to the feedwater tank 46 via a bypass line which is not illustrated. The feedwater tank 46 is connected via a line 47 to a high-pressure feed pump 48 with medium-pressure extraction.

The high-pressure feed pump 48 brings the feedwater S flowing out of the feedwater tank 46 to a pressure level suitable for a high-pressure stage 50 of the water/steam circuit 24. The high-pressure stage is assigned to the high-pressure part of the steam turbine 20. The feedwater S, which is under high pressure, can be supplied to the high-pressure stage 50 via a feedwater preheater 52. The feedwater preheater 52 is connected on the outlet side to a high-pressure drum 58 via a feedwater line 56 capable of being shut off by means of a valve 54.

The high-pressure drum 58 is connected to a high-pressure evaporator 60 arranged in the heat recovery steam generator 30, in order to form a water/steam cycle 62. For the discharge of fresh steam F, the high-pressure drum 58 is connected to a high-pressure superheater 64 which is arranged in the heat recovery steam generator 30 and which is connected on the outlet side to the steam inlet 66 of the high-pressure part 20a of the steam turbine 20.

The steam outlet 68 of the high-pressure part 20a of the steam turbine 20 is connected via a reheater 70 to the steam inlet 72 of the medium-pressure part 20b of the steam turbine 20. Its steam outlet 74 is connected via an overflow line 76 to the steam inlet 78 of the low-pressure part 20c for the steam turbine 20. The steam outlet 80 of the low-pressure part 20c of the steam turbine 20 is connected via a steam line 82 to the condenser 26, so that a closed water/steam circuit 24 is obtained.

Moreover, a branch line 84 branches off from the high-pressure feed pump 48 at an extraction point at which the condensate K has reached a medium pressure. This branch line is connected via a further feedwater preheater 86 or medium-pressure economizer to a medium-pressure stage 90 of the water/steam circuit. The medium-pressure stage is assigned to the medium-pressure part 20b of the steam turbine 20. For this purpose, the second feedwater preheater 86 is connected on the outlet side to a medium-pressure drum 96 of the medium-pressure stage 90 via a feedwater line 94 capable of being shut off by means of a valve 92. The medium-pressure drum 96 is connected to a heating surface 98 arranged in the heat recovery steam generator 30 and designed as a medium-pressure evaporator, in order to form a water/steam cycle 100. For the discharge of medium-pressure fresh steam F', the medium-pressure drum 96 is connected via a steam line 102 to the reheater 70 and therefore to the steam inlet 72 of the medium-pressure part 20b of the steam turbine 20.

A further line 110 provided with a low-pressure feed pump 107 and capable of being shut off by means of a valve 108 branches off from the line 47 and is connected to a low-pressure stage 120 of the water/steam circuit 24. The low-pressure stage is assigned to the low-pressure part 20c of the steam turbine 20. The low-pressure stage 120 includes a low-pressure drum 122 that is connected to a heating surface 124 arranged in the heat recovery steam generator 30 and designed as a low-pressure evaporator, in order to form a water/steam cycle 126. In order to discharge low-pressure fresh steam F", the low-pressure drum 122 is connected to the overflow line 76 via a steam line 128, into which a low-pressure superheater 129 is connected. The water/steam circuit 24 of the gas and steam turbine plant 1 thus comprises three pressure stages 50, 90, 120 in the exemplary embodiment. Alternatively, however, fewer, in particular two, pressure stages may also be provided.

The gas turbine plant 1a is designed to operate with a gasified synthesis gas SG that is generated by the gasification of a fossil fuel B. The synthesis gas provided may be, for example, gasified coal or gasified oil. For this purpose, the combustion chamber 6 of the gas turbine 2 is connected on the inlet side to a gasification device 132 via a fuel line 130. Coal or oil can be supplied as fossil fuel B to the gasification device 132 via a charging system 134.

In order to provide the oxygen $O_2$ required for gasifying the fossil fuel B, the gasification device 132 is preceded via an oxygen line 136 by an air separation plant 138. The air separation plant 138 is capable of being loaded on the inlet side with a part stream T of the air compressed in the air compressor 4. For this purpose, the air separation plant 138 is connected on the inlet side to an extraction air line 140 which branches off from the compressed-air line 8 at a branch point 142. Moreover, a further air line 143, into which an additional air compressor 144 is connected, issues into the extraction air line 140.

In the exemplary embodiment, therefore, the entire air stream L flowing into the air separation plant 138 is composed of the part stream T branched off from the compressed-air line 8 and of the air stream conveyed from the additional air compressor 144. A connection concept of this type is also designated as a partly integrated plant concept. In an alternative embodiment, the so-called fully integrated plant concept, the further air line 143, along with the additional air compressor 144, may also be dispensed with, so that the air separation plant 138 is fed with air completely via the part stream T extracted from the compressed-air line 8.

The nitrogen $N_2$ obtained additionally to the oxygen $O_2$ in the air separation plant 138 during the separation of the air stream L is supplied, via a nitrogen line 145 connected to the air separation plant 138, to a mixing device 146 and is admixed with the synthesis gas SG there. In this case, the mixing device 146 is designed for particularly uniform and strand-free mixing of the nitrogen $N_2$ with the synthesis gas SG.

The synthesis gas SG flowing out from the gasification device 132 first passes via the fuel line 130 into a crude-gas heat recovery steam generator 147, in which cooling of the synthesis gas SG takes place by heat exchange with a flow medium. High-pressure steam generated during this heat exchange is supplied to the high-pressure stage 50 of the water/steam circuit 24 in a way not illustrated in any more detail.

A dedusting device 148 for the synthesis gas SG and a desulfurating plant 149 are connected into the fuel line 130 downstream of the crude-gas heat recovery steam generator 147 and upstream of the mixing device 146, as seen in the direction of flow of the synthesis gas SG. In an alternative embodiment, instead of the dedusting device 148, a soot scrubber device may also be provided, particularly when the gasified fuel is oil.

For especially low pollutant emission during the combustion of the gasified fuel in the combustion chamber 6, the gasified fuel with steam can be loaded prior to entry into the combustion chamber 6. This may be accomplished in a saturator system, which is advantageous in thermal terms. For this purpose, a saturator 150 is connected into the fuel line 130. In the saturator, the gasified fuel is carried in countercurrent to the heated saturator water. In this case, the saturator water circulates in a saturator circuit 152 that is connected to the saturator 150. Into the saturator circuit 152, a circulating pump 154 and a heat exchanger 156 for preheating the saturator water are connected. In this case, the heat exchanger 156 is loaded on the primary side with preheated feedwater from the medium-pressure stage 90 of the water/steam circuit 24. In order to compensate for the losses of saturator water that occur during the saturation of the gasified fuel, a feed line 158 is connected to the saturator circuit 152.

A heat exchanger 159 acting as a crude-gas/mixed-gas heat exchanger is connected on the secondary side into the fuel line 130 downstream of the saturator 150, as seen in the direction of flow of the synthesis gas SG. In this case, the heat exchanger 159 is likewise connected into the fuel line 130 on the primary side at a point upstream of the dedusting plant 148. This configuration allows the synthesis SG to flow into the dedusting plant 148 and transmit part of its heat to the synthesis gas SG flowing out of the saturator 150. The routing of the synthesis gas SG via the heat exchanger 159 prior to entry into the desulfurating plant 149 may also be provided, in this case, with regard to a connection concept which is modified in terms of the other components. Particularly when a soot scrubber device is incorporated, the heat exchanger may be arranged preferably on the crude-gas side downstream of the soot scrubber device.

A further heat exchanger 160, which on the primary side may be feedwater-heated or else steam-heated, is connected on the secondary side into the fuel line 130 between the saturator 150 and the heat exchanger 159. In this case, the heat exchanger 159, designed as a crude-gas/pure-gas heat exchanger, and the heat exchanger 160 ensure particularly reliable preheating of the synthesis gas SG flowing into the combustion chamber 6 of the gas turbine 2, even when the gas and steam turbine plant 1 is in different operating states.

Furthermore, in order to load the synthesis gas SG flowing into the combustion chamber 6 with steam, as required, the fuel line 130 has connected into it a further mixing device 161. Medium-pressure steam can be supplied to the further mixing device via a steam line, not illustrated in any more detail. The medium-pressure steam ensures that the gas turbine operates reliably in the event of operational incidents.

In order to cool the part stream T of compressed air to be supplied to the air separation plant 138 and also designated as extraction air, the extraction air line 140 has connected into it on the primary side a heat exchanger 162 which is designed on the secondary side as a medium-pressure evaporator for a flow medium S'. The heat exchanger 162 is connected, to form an evaporator cycle 163, to a water/steam drum 164 designed as a medium-pressure drum. The water-steam drum 164 is connected via lines 166, 168 to the medium-pressure drum 96 assigned to the water/steam cycle 100. Alternatively, however, the heat exchanger 162 may also be connected directly on the secondary side to the medium-pressure drum 96. In the exemplary embodiment, therefore, the water/steam drum 164 is connected indirectly to the heating surface 98 designed as a medium-pressure evaporator. Moreover, a feedwater line 170 is connected to the water/steam drum 164 for the refeed of evaporated flow medium S'.

Connected into the extraction air line 140 downstream of the heat exchanger 162, as seen in the direction of flow of the part stream T of compressed air, is a further heat exchanger 172 which is designed on the secondary side as a low-pressure evaporator for a flow medium S''. In this case, to form an evaporator cycle 174, the heat exchanger 172 is connected to a water/steam drum 176 designed as a low-pressure drum. In the exemplary embodiment, the water/steam drum 176 is connected via lines 178, 180 to the low-pressure drum 122 assigned to the water/steam cycle 126 and is thus connected indirectly to the heating surface 124 which is designed as a low-pressure evaporator. Alternatively, however, the water/steam drum 176 may also be connected in another suitable way. The steam extracted from the water/steam drum 176 can be supplied as process steam and/or as heating steam to a secondary consumer. In a further alternative embodiment, the heat exchanger 172 also may be connected directly on the secondary side to the low-pressure drum 122. Moreover, the water/steam drum 176 is connected to a feedwater line 182.

The evaporator cycles 163, 174 may in each case be designed as a positive cycle. The cycle of the flow medium S' or S'' is ensured by a circulating pump. The flow medium S', S'' at least partially evaporates in the heat exchanger 162 or 172 designed as an evaporator. In the exemplary embodiment, however, both the evaporator cycle 163 and the evaporator cycle 174 are each designed as a natural cycle. The cycle of the flow medium S' or S'' is ensured by the pressure differences established during the evaporation process and/or by the geodetic arrangement of the respective heat exchanger 162 or 172 and of the respective water/steam drum 164 or 176. In this embodiment, in each case, only one circulating pump (not illustrated) of comparatively small dimension is connected into the evaporation cycle 163 or into the evaporator cycle 174 for the purpose of starting up the system.

For feeding heat into the saturator circuit 152, there is provided, in addition to the heat exchanger 156 which is capable of being loaded with heated feedwater branched off downstream of the feedwater preheater 86, a saturator water heat exchanger 184. The saturator water heat exchanger 184 is capable of being loaded on the primary side with feedwater S from the feedwater tank 46. For this purpose, the saturator water heat exchanger 184 is connected on the primary side to the branch line 84 via a line 186 on the inlet side and to the feedwater tank 46 via a line 188 on the outlet side. For reheating the cooled feedwater S flowing out of the saturator water heat exchanger 184, an additional heat exchanger 190 is connected into the line 188 and on the primary side is located downstream of the heat exchanger 172 in the extraction air line 140. This configuration achieves especially high heat recovery from the extraction air and therefore especially high efficiency of the gas and steam turbine plant 1.

A cooling-air line 192 branches from the extraction air line 140 between the heat exchanger 172 and the heat exchanger 190, as seen in the direction of flow of the part stream T, and a part quantity T' of the cooled part stream T can be supplied to the gas turbine 2 via the cooling-air line as cooling air for cooling the blades.

The arrangement of the mixing device 146 on the fuel side upstream of the saturator 150 enables, in the heat exchanger 159, especially favorable heat transmission from the synthesis gas SG flowing into the saturator 150 and also designated as crude gas to the synthesis gas SG flowing out of the saturator 150 and also designated as mixed gas. In this case, heat exchange is promoted. In particular, the heat exchanger 159 promotes heat exchange by transmitting the heat from the crude gas to a particularly high mass flow of the mixed gas. Thus, even in the case of a limited final temperature, a comparatively large amount of heat can be transmitted to the mixed gas flowing out of the saturator 150. The gas and steam turbine plant 1 therefore has especially high plant efficiency.

We claim:

1. A gas and steam turbine plant, comprising:
   a gas turbine having a flue-gas side and a combustion chamber;
   a steam turbine with a water/steam circuit;
   a fuel line connected to said combustion chamber;
   a saturator connected to said fuel line;
   a heat recovery steam generator located downstream of said gas turbine on said flue-gas side, said heat recovery generator having heating surfaces connected into said water/steam circuit of said steam turbine, and said heat recovery generator having a fuel gasification device located upstream of said combustion chamber of said gas turbine on said fuel line;
   a heat exchanger having a primary side and a secondary side, said heat exchanger connected on said primary side into said fuel line between said gasification device and said saturator, said heat exchanger connecting on said secondary side into said fuel line between said saturator and said combustion chamber; and
   a mixing device admixing nitrogen in said fuel line between said heat exchanger and said saturator.

2. The gas and steam turbine plant according to claim 1, including:
   a crude-gas heat recovery steam generator upstream of said saturator, preceding said heat exchanger in said fuel line.

3. The gas and steam turbine plant according to claim 1, including:
   a further heat exchanger having a primary side and a secondary side, said secondary side of said further heat exchanger connected into said fuel line between said saturator and said combustion chamber.

4. The gas and steam turbine plant according to claim 3, wherein said further heat exchanger is heated by feedwater.

* * * * *